June 10, 1952
A. A. BRANT
2,599,687
DRILL HOLE MAGNETOMETER APPARATUS
Filed April 23, 1949
2 SHEETS—SHEET 1
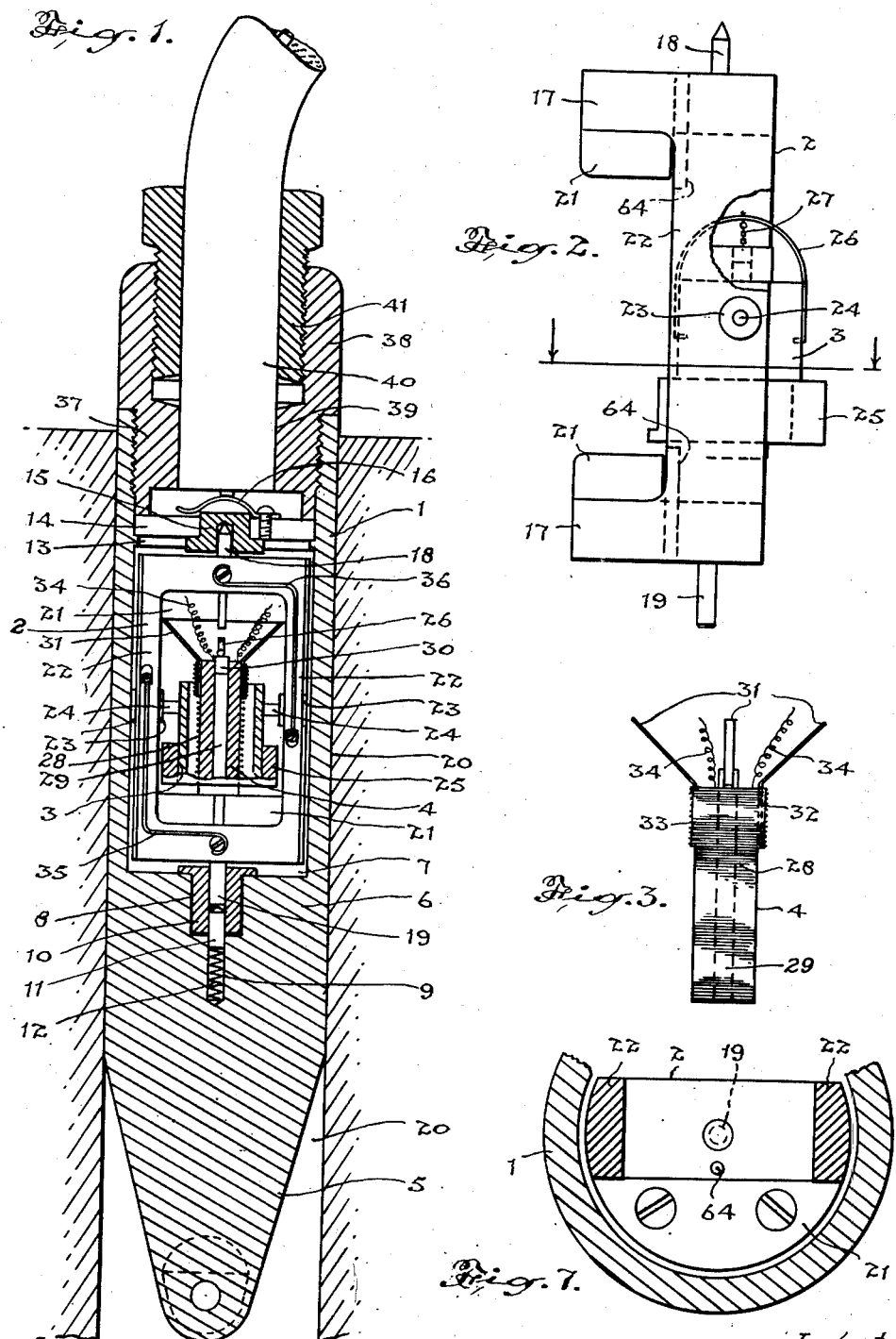
Inventor
Arthur A. Brant
by Douglas S. Johnson June 10, 1952     A. A. BRANT     2,599,687
DRILL HOLE MAGNETOMETER APPARATUS Filed April 23, 1949     2 SHEETS—SHEET 2

Inventor
Arthur A. Brant
by Douglas Johnson
atty

Patented June 10, 1952

2,599,687

UNITED STATES PATENT OFFICE 2,599,687

DRILL HOLE MAGNETOMETER APPARATUS

Arthur A. Brant, Toronto, Ontario, Canada, assignor to Geophysical Exploration Company, New York, N. Y., a corporation of Delaware Application April 23, 1949, Serial No. 89,335
In Canada November 10, 1948

9 Claims. (Cl. 175—182)

This invention relates to a method of subterranean surveying by utilizing a novel magnetometer device of the saturation induction type to be used down a drill hole to indicate variations in the magnetic field surrounding the hole and hence detect the presence of adjacent bodies having magnetic characteristics varying from the normal magnetic characteristics of the locale.

The principal object of the invention is to provide a compact rugged and water-tight magnetometer detector unit which can be used down a drill hole and will withstand the pressures of water encountered down the hole and which will be extremely sensitive to indicate small variations in the magnetic field intensity along the hole.

A further important object is to provide a magnetometer in which the detector element will be influenced only by the vertical magnetic component down the drill hole independent of the inclination or angle of the hole and will therefore dependably record variations in the magnetic field and not merely different field components.

The principal feature of the invention consists in providing a pressure-resistant waterproof nonmagnetic casing adapted to be inserted down a drill hole and supporting a saturation induction detector unit or element within the casing in a novel manner whereby the detector element will remain vertical under the influence of gravity independent of the position or movement of the casing.

A further important feature consists in suspending the detector element within a vertically orienting assembly by means of a flexible suspension to further reduce the restoring couple required to swing the detector to a vertical plane.

A still further feature consists in providing adjustable counter-balancing means to enable the detector element to be accurately balanced to assume a truly vertical position.

A further important feature consists in forming the detector unit as an extremely compact single high impedance coil wound on a highly magnetic core readily driven to saturation.

Referring to the accompanying drawings,

Figure 1 is a mid-vertical sectional view of a saturation induction detector unit constructed in accordance with my invention and showing the unit inserted down a drill hole.

Figure 2 is an enlarged side elevational view of the orienting frame assembly arranged within the detector unit casing.

Figure 3 is an enlarged elevational view of the saturation detector coil utilizing my detector unit.

Figure 6A:
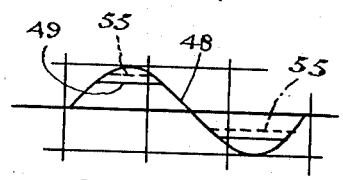
Figure 6A is a diagrammatic view illustrating the variation in the core flux in the coil of Figure 3 in the presence of an external magnetic field and illustrating how the presence of an external magnetic field upsets the symmetry of the voltage wave form induced in the coil, the illustrations corresponding to those obtained with a sinusoidal signal current being applied to the coil.
Figure 6B:
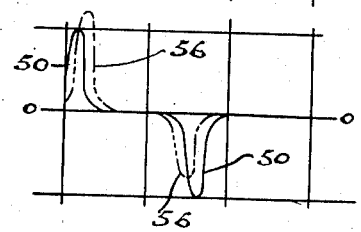

Figure 6B illustrates the wave form of the E. M. F. induced in the detector coil by the flux fields shown in Figure 6A.

Figure 7 is a part sectional view through the casing and cradle showing a weight secured to the cradle.

The use of a saturation induction magnetometer unit as a sensitive magnetic detector has been known for some time. Essentially the saturation induction detection element comprises a coil arrangement wound on a highly permeable magnetic core of Permalloy Mumetal or the like so that the core when energized becomes completely saturated in magnetic fields of only a few gauss.

If such a core, energized and driven to saturation, is exposed to an external magnetic field the symmetry of the magnetic flux of the coil will be upset and the resultant E. M. F., induced in a secondary coil or back into the primary coil itself, will have a different characteristic when the flux of the coil is combined with an external field than if the external field were lacking, and this change in the characteristic of the induced E. M. F. can be readily determined to give an indication of the presence of an external magnetic field.

Heretofore the saturation induction magnetometer has been employed as a surface detection unit. While such surface units give a general indication of the magnetic characteristics of rock or mineral formations adjacent the earth surface, this information is not of sufficient accuracy to permit of a comprehensive survey of subterranean formations to be made.

Owing to the extremely delicate nature of the detector element, particularly for use down diamond drill holes of EX type (1⅜" diameter) and its necessity to be maintained aligned in the total magnetic field, it has not hithertofore been considered possible to use such a detector in making subterranean magnetic surveys.

The present invention however completely revises the capabilities of the saturation induction magnetometer by providing a detector unit which, while ensuring all the sensitivity of a saturation induction element, can be inserted down a drill hole at any inclination.

With the devising of such a unit the present invention envisages a novel method of determining the magnetic characteristic of subterranean formations by sinking a drill hole through the formation to be expored and utilizing my saturation induction detector unit down the drill hole to obtain variations in the magnetic characteristics along the hole, which variations enable an accurate magnetic survey to be made.

In this manner valuable diagnostic information of the magnetic characteristics of a certain locale can be determined without requiring the necessity for sinking the numerous test drill holes now required, thus greatly facilitating the survey of subterranean area and greatly reducing the time and cost involved.

Referring first to Figures 1, 2 and 3 depicting my novel detector unit, it will be seen that the unit comprises a cylindrical casing 1 which is non-magnetic and preferably formed of stainless steel, and arranged within the casing is the orienting unit assembly comprising the frames 2 and 3 illustrated in Figure 2 with the frame 3 supporting the saturation induction element 4 shown in Figure 3.

Preferably the casing 1 is formed with a pointed nose 5 and formed in the end wall 6 of its bore 7 is a reduced axial bore 8 beyond which extends a central passage 9.

Mounted in the reduced axial bore 8 is a bushing 10 and in this bushing is a pivot pin 11 spring-urged upwardly by the compression spring 12 arranged in the passage 9.

In spaced relation from the wall 6 of the casing bore is an annular shoulder 13 against which abutts a cylindrical insulating disc 14 in which is secured a bushing 15 similar to the bushing 10 and axially aligned therewith.

Mounted on the insulating disc 14 is a curved spring metal contact arm 16 which is adapted to maintain electrical connection with the bushing 15.

The orienting assembly shown in Figure 2 formed of the frames 2 and 3 is mounted between the bushings 10 and 15. As shown the frame 2 is of generally rectangular configuration and is formed of an insulating material.

Extending laterally from each end of the frame 2 are substantially semi-circular projections 17 which give the frame the appearance of a cradle. Extending from the end of the frame or cradle 2 are pin projections 18 and 19 with the end of the upper pin projection 18 being pointed to provide a pivot point engaging the end wall of the upper bushing 15. The pin projection 19 projecting from the lower end of the cradle 2 is adapted to extend within the lower bushing 10 and the end of said pin is engaged by the spring-urged pivot pin 11.

The cradle is thus supported to rotate about an axis coincident with the axis of the casing 1 with the major dimension of the cradle aligned with the major dimension of the casing, thus permitting a reduction of the casing diameter to permit it to be readily entered into the drill hole 20.

Secured to the semi-circular projections 17 of the cradle 2 are correspondingly shaped weights 21 which function to rotate the cradle about its longitudinal axis and maintain same in the desired oriented position with the weighted projections 17 downwardly where the casing is inclined at an angle to the vertical.

Mounted in the longitudinal side walls 22 of the cradle or frame 2 are bushings 23 which align with the transverse centre line of the frame. These bushings 23 form the bearing surfaces for the pin projections 24 of the frame 3 which is in the form of a cylinder or sleeve of insulating material.

The sleeve or frame 3 is thus supported to rotate about an axis transverse of the frame or cradle 2 and its dimension is such that it can readily rotate within the cradle.

Encircling and secured to the sleeve 3 remote from the pivot axis is an annular or ring-shaped weight 25 which ensures that the sleeve will swing on its pivots to assume a vertical position under the influence of gravity, with the weight 25 always below the pin projections 24.

Secured to and extending over the end of the sleeve 3 remote from the weighted member 25 is a curved metal clip 26, and suspended from this clip by means of a flexible suspension 27 in the form of a small metal chain is the saturation induction detector element shown in detail in Figure 3. This induction element comprises a coil 28 wound on a highly magnetic core 29 of Mumetal or other highly permeable magnetic material.

The upper end of the coil extends slightly above its core to receive a suitable plug 30 to which the flexible suspension 27 is secured.

Secured to the periphery of the coil 28 in diametrically opposed relation are copper strips 31 which extend above the upper end of the coil and are bent outwardly forming balancing arms, the length and weight of which can be accurately controlled to ensure that the coil will assume a vertical position when held or suspended by the flexible chain or suspension 27.

Binding the strips 31 to the coil is a cellulose tape 32 around which is wound thread 33 with the thread and tape coated with a suitable bonding cement.

Connecting the ends of the coil 28 are leads in the form of pigtail windings 34 which permit the coil to swing freely within the sleeve 3 and provide individual electrical connection with each of the pin projections 24 arranged on either side of the cradle 2. One of these pin projections is connected through the conductor 35 to the bottom bushing 10 to provide electrical connection through said bushing to the casing 1. The opposite pin projection 24 is electrically connected to the upper bushing 15 through the conductor 36.

Fitting in the casing 1 is a cap 37 formed with an extension 38 which threadedly engages within the threaded upper end of the casing and serves to lock the insulating disc 14 against the annular shoulder 13. The cap 37 is formed with a bore 39 to receive the co-axial or twin conductor cable 40, with one of the conductors being "grounded" to the casing while the other is connected to the contact arm 16.

Surrounding the cable and threading into the outer end of the cap 37 is a cable fitting or gland 41 which ensures a water-tight fit between the cable and casing.

In using the detector device down a drill hole the cradle 2 carrying the weights 21 automatically orients under the influence of the force of gravity so that the pivotal axis of the sleeve 3 is horizontal. The sleeve 3 then automatically becomes oriented under the force of the field of gravity acting on its weight 25 so that its axis is vertical.

Since the detector element in the form of the coil 28 is supported within the sleeve by means of the flexible suspension 27 it will freely swing with a pendulum effect within the vertical sleeve and as it has been accurately balanced by means of the strips 31 it will hang in a perfectly vertical position. It will be understood that with the flexible suspension the couple required to swing the coil from a non-vertical to a vertical position will be extremely small with the flexible suspension offering negligible resistance and thus any inaccuracies occurring in the orientation of the cradle and sleeve 2 and 3 respectively, caused by the friction at their pivots, will be nullified by the ability of the coil 28 to swing as a pendulum to the vertical.

In utilizing the saturation induction element in the form of the coil 28 a signal is impressed down the cable 40, as will hereinafter be described, and this signal will be applied between the "grounded" casing which connects through the lower bushing 10 to one side of the coil 28 across the coil, the opposite end of which connects through the upper bushing 15 and contact arm 16.

The casing 1 and the enclosed orientating assemblies and saturation induction detector element form a pressure-resistant water-tight unit which can be readily utilized down a drill hole and which will ensure that, independent of the inclination of the hole or position of the casing, the coil 28, which forms the saturation induction detector element, will automatically and accurately orient in the vertical plane to detect only the vertical component of the total magnetic field surrounding the drill hole.

In the energization of the saturation induction detection element in the form of the coil 28 wound on the highly permeable core 29, a signal generator or oscillator 42 capable of delivering a sinusoidal current waveform output, preferably of a low frequency, say for convenience, a thousand cycles per second, is connected through a control unit 43, as shown in Figure 1, to energize the detection element 28—29.

Since the apparatus may frequently be employed where no source of electrical energy is available, the equipment is run from a 6-volt storage battery 44 in conjunction with a vibratory power supply unit 45.

The control unit 43 includes a filter section 46 (see Figure 5) and a D. C. section for bucking out the ambient earth's magnetic field linked with the detector coil. The filter section 46 consists of a D. C.-blocking condenser $F_1$ and a 2000 cycle blocking-filter system identified generally by $F_2$ and $F_3$, $F_2$ being tuned sharply at 1000 cycles. Consequently, this filter section permits only the 1000 cycle component of the sine wave signal current (from the oscillator 42) to pass to the detector coil 28 through the jack connection 47 and the cable 40. The D. C. bucking-out section comprises, essentially, the D. C. source 57 applied across a group of resistors 58, 60, 61 and 62, whereby a known voltage can be applied between the cable 40 and ground to balance out the effect of any constant or ambient magnetic field acting upon the detector coil 28. A 2000 cycle response from the coil 28 produces a 2000 cycle voltage across the resistor 52, which voltage is impressed upon the tuned receiver 54 (Figure 4) across the lead 51 and ground. The condenser $F_4$ (Figure 5), blocks out any D. C. component and this condenser together with inductance L constitutes a 2000 cycle acceptance filter. Included within the tuned receiver 54 is a 1000 cycle blocking filter arrangement and a 2000 cycle pass filter arrangement connected between the lead 51 and ground. These latter arrangements are substantially similar to the filter arrangement 46.

The 1000 cycle signal applied to the coil 28 is of sufficient magnitude to completely saturate the core 29 and, in accordance with Figure 6A, the sine wave signal current, illustrated by the sinusoidal wave form 48 produces, with the absence of an external magnetic field, a flux in the coil which has the peaks of the applied signal evenly clipped to form the symmetrical flux wave form having clipped peaks as illustrated by the solid straight-line peaked wave form 49.

The coil flux illustrated by the curve 49, (Figure 6A), leads to the symmetrical induced E. M. F. waveform 50 in the coil 28, (Figure 6B). As this waveform is symmetrical it gives rise, as is well known by Fourier and other analysis, to only odd order harmonics, and thus the E. M. F. induced back into the coil 28 will include only the first, third, fifth, etc. harmonics.

Figure 4:
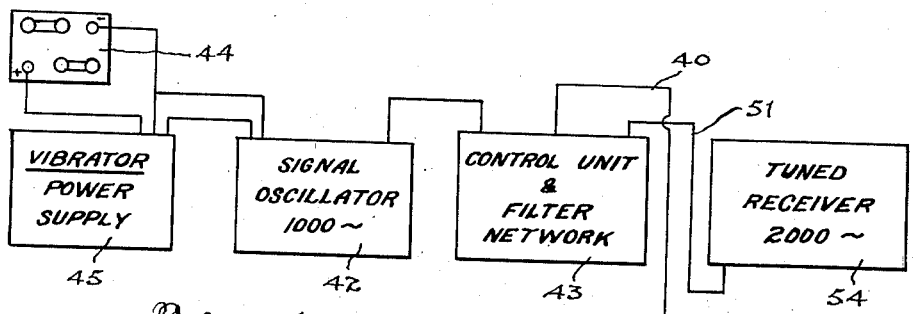
Figure 4 is a block diagram illustrating the various units required to energize the detector unit and to record the variations in the magnetic field detected by the detector unit.
Figure 5:
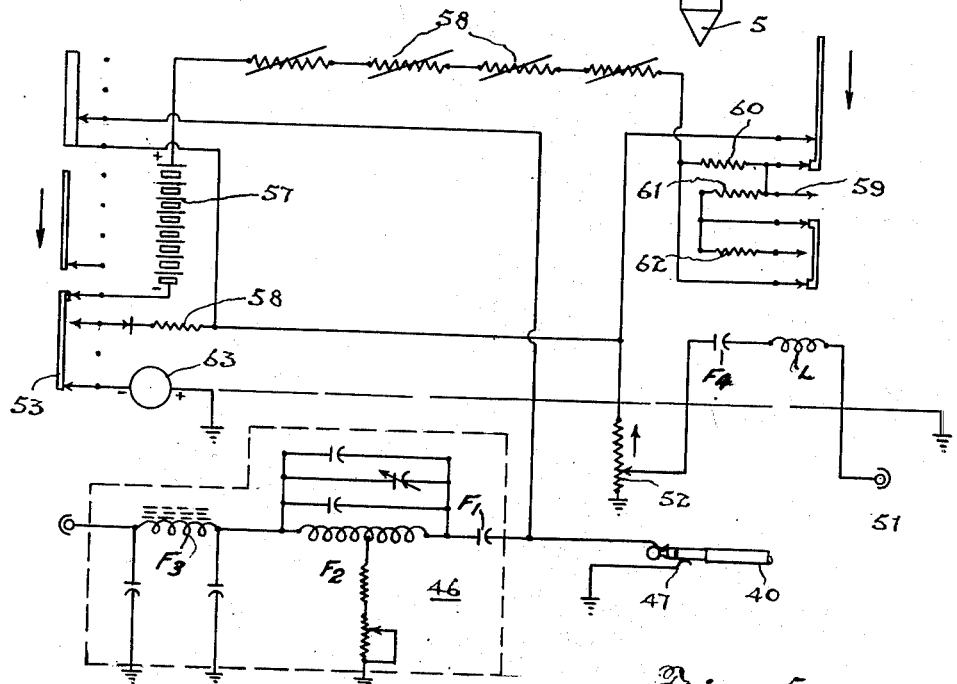
Figure 5 is a schematic wiring diagram of the control unit utilized with my detector unit.

Connected through the control unit via the terminal 51, variable resistance contact 52 and test switch 53 is a receiver unit 54, Figure 4, which has a high sensitivity and which is tuned with high selectivity to a 2000-cycle signal and serves to indicate or detect signals arriving back from the coil 28. Since the receiver is tuned to only the 2000-cycle component of any signal the receiver will not give any indication of the presence of the third, fifth, etc. harmonics of the 1000-cycle signal and, therefore, does not respond to a coil flux change such as that shown in the curve 49 of Figure 6A, or to an induced coil E. M. F. such as that shown by the curve 50 of Figure 6B.

Where the saturation induction coil 28 is located in a magnetic field the flux waveform surrounding the coil will be distorted from the symmetrical flux waveform 49 of Figure 6A to the clipped non-symmetrical flux waveform 55 having the dotted straight-line peaks, and this non-symmetrical flux waveform 55 gives rise to the non-symmetrical induced E. M. F. waveform 56, Figure 6B, which incorporates a percentage of even harmonics of the 1000-cycle sinusoidal current signal.

These second harmonics are accepted by the tuned receiver 54 which amplifies the 2000-cycle second harmonic sufficiently so that it may be readily detected by a meter or earphones.

Since the normal earth magnetic field creates a second harmonic of the signal voltage, I prefer to balance the second harmonic for zero output in the receiver at a chosen reference station. This balancing is accomplished by utilizing a direct current to balance, or buck out, the effects of the magnetic field at the detector coil 28. The magnitude of this direct current passed through the coil 28 is adjusted until the flux wave form changes from the asymmetrical curve 55 (Figure 6A) to the symmetrical curve 49, at which point any 2000 cycle component in the tuned receiver 54 disappears. This balancing is accomplished by utilizing a fixed voltage source 57 in the form of a plurality of mercury cells and utilizing with the fixed voltage source the series decade resistances 58 which may be adjusted as desired, and included in or out of the circuit by means of the switch 59 are the further resistors 60—62.

A meter 63 can be connected, selectively, through the switch 53 to check variation in the de-magnetizing D. C. current, to check the amplitude of the 1000-cycle component sinusoidal A. C. current and to calibrate the apparatus in relation to the detector element.

Thus at a reference station the resistors 58 and switch 59 are adjusted to give zero signal in the receiver 54 and they are again adjusted at a new station with the adjustments calibrated to indicate the variation in the magnetic field from the reference to the new station.

The electrical circuits of the various units include of course the necessary adjustments and variables to ensure their proper operation and it is deemed that the block showing of Figure 4 amply illustrates the manner in which my detection magnetometer unit is utilized as a detection element to indicate at a remote station the variations in the magnetic characteristics of the rock formation adjacent the hole at various stations down the drill hole.

In operation my detector unit enclosed in the casing 1 is inserted a desired distance down the hole and is allowed to remain stationary until the pendulum motion of the coil 28 has ceased and the D. C. voltage required to balance the external field to give zero output in the receiver unit is measured by the meter 63 and this reading compared with the reading required to balance the field at a reference station.

The readings taken at various points down the hole will thus give valuable diagnostic information in producing a magnetic survey in terms of the vertical component of the magnetic field.

With my development of a magnetometer detection unit which can be used down a drill hole and will orient with accuracy to measure the vertical component of the external field, I have introduced a new and extremely important method of obtaining comprehensive subterranean magnetic surveys, and it will be readily appreciated that my method of utilizing a saturation induction detector at various subterranean points will greatly facilitate magnetic surveying and will materially reduce the time involved in conducting such surveys.

The saving of the expense involved in sinking the numerous drill holes now required for obtaining samples of the magnetic material adjacent the locale further adds to the importance of my method wherein a single drill hole enables a determination of the magnetic characteristics throughout the locale to be determined.

As the detecting coil 28 maintains an aligned vertical position in the total magnetic field the variations in the second harmonic signal output from the coil will be accurate indications of variations in the vertical field component so that positive information is continually conveyed to the surface station.

While I have preferably used the single coil saturation induction element to reduce its size to a dimension which will permit it to be mounted in a casing that can be inserted down a drill hole. It will be appreciated that variations in the detection element may be made without departing from the scope of my invention.

While the coil 28 is permitted free swinging movement and its inner supporting sleeve frame 3 can freely swing as permitted by the pig-tail windings 34, to prevent the continuous rotation of the sleeve to a point where the pig-tail windings become wound around the pins 24, suitable stops 64 are incorporated on the cradle frame 2 to prevent complete rotation of the sleeve frame 3 on its pivots.

As previously emphasized, to obtain a required degree of accuracy the saturation induction element must be maintained with its axis vertical and must have as great a length as possible within the casing. It has been established that to give a desired accuracy of 5 gammas the induction unit must be maintained in a vertical position within approximately .003 radian. It will be appreciated that normal gimbal suspensions will not provide this desired accuracy due to friction at the pivots, but such accuracy can be obtained with my pendulum suspension within a roughly orienting gimbal arrangement.

While preferably I measure vertical field intensities it will be appreciated that the saturation induction element may be mounted on a suspension to assure a horizontal position to measure the horizontal magnetic field component, and it will be understood that such arrangements are fully contemplated within the scope of my invention.

In view of the foregoing, it will be appreciated that the development of my novel magnetometer apparatus which leads to a new method of drill hole magnetic surveying will be extremely important in mining and similar operations, the present unit readily permitting the recording of the vertical (or horizontal) magnetic intensity in drill holes of any inclination and down to the smallest size.

What I claim as my invention is:

1. In a drill hole magnetometer apparatus, a longitudinal cylindrical non-magnetic waterproof casing, an eccentrically-weighted frame pivoted within said casing to rotate about an axis coinciding with the axis of said casing, a second eccentrically-weighted frame pivoted to said first-mentioned frame to rotate about an axis at right angles to the axis of said first frame, a detector element suspended from, and disposed within, the said second frame, and leads extending through said casing and in electrical contact with said detector element.

2. In a drill hole magnetometer apparatus the combination of a non-magnetic, watertight casing adapted for insertion into a drill hole; a hollow member of insulating material removably secured within the casing, gimbals supporting said hollow member in a vertical position irrespective of the axial disposition of the casing; a saturation induction detector element; a flexible member suspending the said detector element within the hollow member; and leads electrically connected to the detector element, said leads extending outwardly of the said casing.

3. In a drill hole magnetometer apparatus the combination of a substantially cylindrical, non-magnetic, watertight casing adapted for insertion into a drill hole; an eccentrically pivoted frame of insulating material rotatably mounted within the casing; a second eccentrically pivoted frame of insulating material carried by the first frame for rotation about an axis normal to that of the said first frame; a saturation induction detector element suspended from the said second frame; and leads extending through one end of the casing and electrically connected to the said detector element.

4. In a drill hole magnetometer apparatus, a substantially cylindrical pressure-resistant casing adapted to be inserted in a drill hole, a non-magnetic cradle pivoted on an axis coincident with the axis of said casing, weights carried by said cradle and eccentric to the pivotal axis thereof to swing the cradle to assume an equilibrium position under the influence of gravity, a non-magnetic sleeve pivotally supported by said cradle to swing about an axis at right angles to the axis of said cradle, a weighted element carried by said sleeve to swing same to assume a vertical equilibrium position under the influence of gravity, stop means to limit the rotation of said sleeve, a saturation induction coil suspended within said sleeve, and means to enable said coil to be balanced to assume a vertical position within said sleeve.

5. A device as claimed in claim 4 in which the pivots of said cradle are electrical conductors, and cable means are provided extending into said casing to connect a remote station with said pivots, said coil having the ends thereof connected with pigtail windings to provide electrical connection with said pivots and to permit the rotation of said sleeve and coil.

6. Apparatus for exploring the magnetic character of subterranean formations comprising a water-tight casing of non-magnetic material adapted for insertion into a drill hole; a saturable core within the casing; means orienting the core in a vertical position irrespective of the inclination of the casing; a coil carried by the core; an oscillator providing a sinusoidal current of predetermined frequency and sufficient to saturate the said core; a filter network connected between the oscillator and the coil, said filter network adjusted to the oscillator frequency; a receiver responsive to the E. M. F. induced in said coil; and a filter network connected between the receiver and said coil, said latter filter network adjusted to pass only the second harmonic of E. M. F. induced in the said coil.

7. The invention as recited in claim 6 wherein the means orienting the core in a vertical position comprises an eccentrically-weighted frame pivotally mounted in the casing, a second eccentrically-weighted frame pivotally mounted within the first frame for rotation about an axis normal to that of the said first frame, and a resilient member suspending the said core within the said second frame.

8. The invention as recited in claim 7, in combination with a source of D. C. potential, means to adjust the magnitude of the D. C. potential to balance out the induced voltage in the said coil by the earth's magnetic field, and means blocking D. C. potentials induced in the coil from the said receiver.

9. A method of investigating the magnetic character of subterranean formations consisting of running a drill hole through the formation, inserting a saturation induction element, including a core, into the drill hole to a known depth, applying a known magnitude of D. C. current into the induction element to create a magnetic flux in its core to balance out the flux in the core arising from the earth's normal magnetic field, applying an A. C. current of predetermined frequency to the induction element, and measuring the magnitude of the second harmonic of the resulting A. C. voltage induced in the induction element solely by the vertical component of the magnetic field around the said element.

ARTHUR A. BRANT.

REFERENCES CITED

The following references are of record in the file of this patent:

UNITED STATES PATENTS

| Number | Name | Date |
|---|---|---|
| 2,338,991 | Arnold | Jan. 11, 1944 |
| 2,441,065 | Green | May 4, 1948 |

OTHER REFERENCES

Geophysics, July 1946, pages 321–334.
Geophysics, August 1948, pages 182–214.